US008296312B1

United States Patent
Leung et al.

(10) Patent No.: US 8,296,312 B1
(45) Date of Patent: Oct. 23, 2012

(54) SEARCH AND UPDATE OF ATTRIBUTES IN FILE SYSTEMS

(75) Inventors: Andrew Leung, Pleasanton, CA (US); Minglong Shao, Sunnyvale, CA (US); Shankar Pasupathy, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 813 days.

(21) Appl. No.: 12/013,953

(22) Filed: Jan. 14, 2008

(51) Int. Cl.
*G06F 7/00* (2006.01)
(52) U.S. Cl. ...................................... 707/760; 707/796
(58) Field of Classification Search ........... 707/999.001, 707/999.002, 999.003, 760
See application file for complete search history.

(56) References Cited

U.S. PATENT DOCUMENTS

| | | | |
|---|---|---|---|
| 7,058,639 B1 * | 6/2006 | Chatterjee et al. | 707/999.1 |
| 7,660,853 B2 * | 2/2010 | Scott et al. | 709/205 |
| 7,668,827 B2 * | 2/2010 | Gould et al. | 707/999.006 |
| 2006/0117049 A1 | 6/2006 | Jain et al. | |

OTHER PUBLICATIONS

Baumgartner, Peter, "Path-Based Query Computation by Automated Deduction", *Slides of talk held at an internal meeting at AG5, Max-Planck-Institut for Computer Science*, (Jan. 2004), 10 pgs.
Matono, Akiyoshi, et al., "A path-based relational RDF database", *ACM International Conference Proceeding Series*; vol. 103, Proceedings of the 16th Australasian database conference—vol. 39, (2005), 95-103.
Meuss, Holger, et al., "Improving Index Structures for Structured Document Retrieval", *21st Annual BCS-IRSG Colloquium on IR*, Glasgow. 19th-20th, (Apr. 1999), 1-14.

* cited by examiner

*Primary Examiner* — Amy Ng
(74) *Attorney, Agent, or Firm* — Schwegman Lundberg & Woessner, P.A.

(57) ABSTRACT

Example embodiments provide various techniques for fast and efficient search of attributes stored in data structures. The attributes are organized following a hierarchical structure of the file system and, in an example, the attributes are stored in a data structure where the hierarchical structure is maintained. As a result, a search within such data structure may follow one or more paths along the hierarchical structure of the file system. Attributes associated with directories and files outside of the path can be excluded from the search. Example embodiments also provide various techniques for updating signatures associated with the attributes. In an example, updates to the signatures can be made incrementally. For example, signatures can be updated when the attributes change.

20 Claims, 13 Drawing Sheets

SEARCH AND UPDATE OF ATTRIBUTES IN FILE SYSTEMS

FIELD

The present disclosure relates generally to storage systems. In an example embodiment, the disclosure relates to the search and update of attributes in file systems.

BACKGROUND

Attributes (e.g., metadata) associated with a file system can be used to provide information about how data stored in the file system is managed and utilized. For example, a user (e.g., an administrator that manages a storage system or a storage system user) may access various attributes, such as file locations and file access time, to make decisions as to where data is to be optimally stored. In another example, a user may need access to attributes, such as file and directory sizes, to manage storage resources in a storage system.

If the attributes are searchable, the attributes are typically stored in a relational database. This relational database stores all the attributes as being derived from a flat, unrelated space. Where a large number of attributes is stored (e.g., from millions of datasets to billions of datasets), access to these attributes is inefficient and slow because every single record within the relational database must be searched. The slow access times may lead to the under utilization of the storage system because attribute information is not readily accessible to users. Such under utilization can negatively affect the cost, management, performance, and reliability of the storage system because the users do not have a strong understanding of the state and activity of the storage system.

SUMMARY

Example embodiments provide various techniques for fast and efficient search of attributes. Generally, an attribute is metadata about one or more directories and/or one or more files associated with a file system. Examples of attributes include file size, file type, file access time, and other attributes. Similar to the organization of directories and files in a file system, the attributes are also organized following a hierarchical structure of the file system. In a hierarchical structure, the attributes may be ranked, where an attribute can be a subordinate to another attribute.

The attributes may be stored in one or more data structures, such as tables and databases. In an example, the attributes may be stored within the data structure where the hierarchical structure of a file system is maintained. The hierarchical structure can be maintained, for example, by including an index within the data structure that identifies the relationships between various files and directories. As a result, a search within such a data structure may follow one or more paths along the hierarchical structure of the file system. For example, a search of attributes may be along a pre-defined path. The attributes associated with files and directories in the pre-defined path are relevant to the search. On the other hand, attributes associated with directories and files outside of the pre-defined path can be excluded from the search. The elimination of irrelevant attributes from a search space results in a fast search because only a portion of the attributes, which is associated with the pre-defined path, stored within the data structure is searched.

In addition, the search may be made faster with the inclusion of signatures in the data structure. In general, signatures are compact descriptions of the attributes. The size of a signature are smaller or more compact than the size of an attribute. As a result, the signatures can be searched quickly because a smaller number of values are searched. In an example, an initial search of signatures can be made to quickly identify relevant attributes. A more thorough search can thereafter be made of the actual, relevant attributes as identified in the initial search of signatures.

Example embodiments also provide various techniques for updating the signatures associated with the attributes. In an example, the updates to the signatures can be made incrementally. For example, signatures can be updated when the attributes change. An example of an attribute change can include the addition of a directory or file. Here, for example, the signatures of the parent directories of the added directory or added file are updated. Another example of an attribute change can include the removal of a directory or file. Here, for example, the signatures may be updated if the attributes are not found in the subdirectories associated with the removed directory or file.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Figure 1:
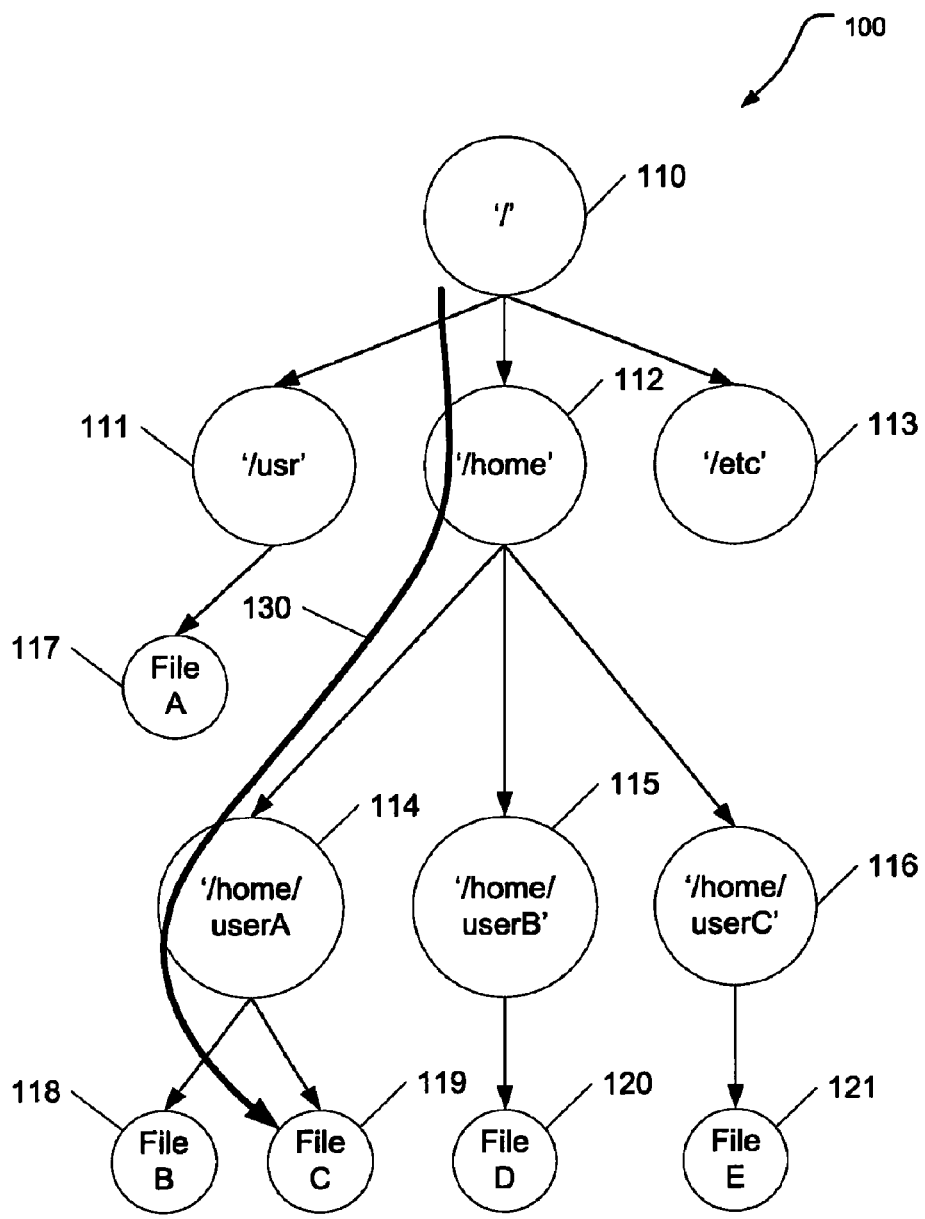
FIG. 1 is a diagram of an example of a hierarchical structure of a file system namespace associated with a file system and illustrates an example of a hierarchical structure.

Generally, a computer file is a collection of data or computer program records stored as a unit with a single name. A directory is an entity within a file system that includes a list of files or other directories. In a computer file system, files and directories are organized following a hierarchical structure. FIG. 1 is a diagram of an example of a file system namespace associated with a file system and illustrates an example of a hierarchical structure 100. In general, a file system provides a computing device with instructions for storing, managing, and organizing data, such as files. The directories and files in the file system are organized following a hierarchical structure of the file system. In general, a hierarchical structure is a system for ranking various elements, such as files and directories. An example of hierarchical structure 100 is illustrated in FIG. 1. In the illustrated example, hierarchical structure 100 can be a tree structure, where links branch out from one or more nodes 110-121 without forming closed loops. It should be appreciated that nodes 110-121 correspond to entries in a file system namespace. Generally, a file system namespace is a context for identifiers within the file system. An example of an entry in a file system namespace is a name of a directory (e.g., "/user," "/home," and other directory names). Another example of an entry in a file system namespace is a name of a file (e.g., "FileA," "FileB," and other file names).

As such, nodes 110-121 may correspond to directories or files of a file system namespace. As illustrated in FIG. 1, nodes 110-116 correspond to directories, while nodes 117-121 correspond to files included in the directories. It should be noted that a node is a parent of another node if this node is one step higher in the hierarchy. For example, node 114 is the parent node of node 119. In another example, node 112 is the parent node of nodes 114-116. A node is a child of another node if this node is one step lower in the hierarchy. For example, node 117 is the child node of node 111. In another example, nodes 114-116 are child nodes of node 112.

In the file system, one or more attributes may be associated with each of the nodes 110-121. Generally, an attribute is metadata about one or more directories and/or one or more files associated with a file system. An attribute, for example, can include a file type. In another example, an attribute can include a file size. In still another example, the attribute can include a directory name and/or a file name. In yet another example, an attribute can include the path to a file or a directory, which may be a combination of the directory name and/or file name. The path may, for example, be a string of characters that define or identify a file or a directory (e.g., \home\userB\). Other examples of attributes include directory size, owner of the file, owner of the directory, file access time, file modification time, file creation time, and other attributes. In an example, an attribute may be distinct from node identifiers and indexes (which are explained in more detail below). Attributes are stored in one or more data structures and, as explained in more detail below, the attributes are stored within the data structure where hierarchical structure 100 of the file system is maintained. As a result, an attribute may be located in a data structure by following hierarchical structure 100 of the file system. For example, attributes associated with node 119 may be located by searching along path 130, which is defined by nodes 110, 112, 114, and 119, that reaches or links to the node 119. As explained in more detail below, the nodes that are not associated with path 130 (e.g., nodes 115 and 116) can be excluded from the search. Therefore, instead of searching all nodes 110-121 for an attribute, only a portion of the nodes is searched (e.g., nodes 110, 112, 114, and 119 associated with path 130). As a result, the time to search for attributes can be reduced. Furthermore, methods for updating the file system when attribute changes are detected are explained below.

Figure 2:
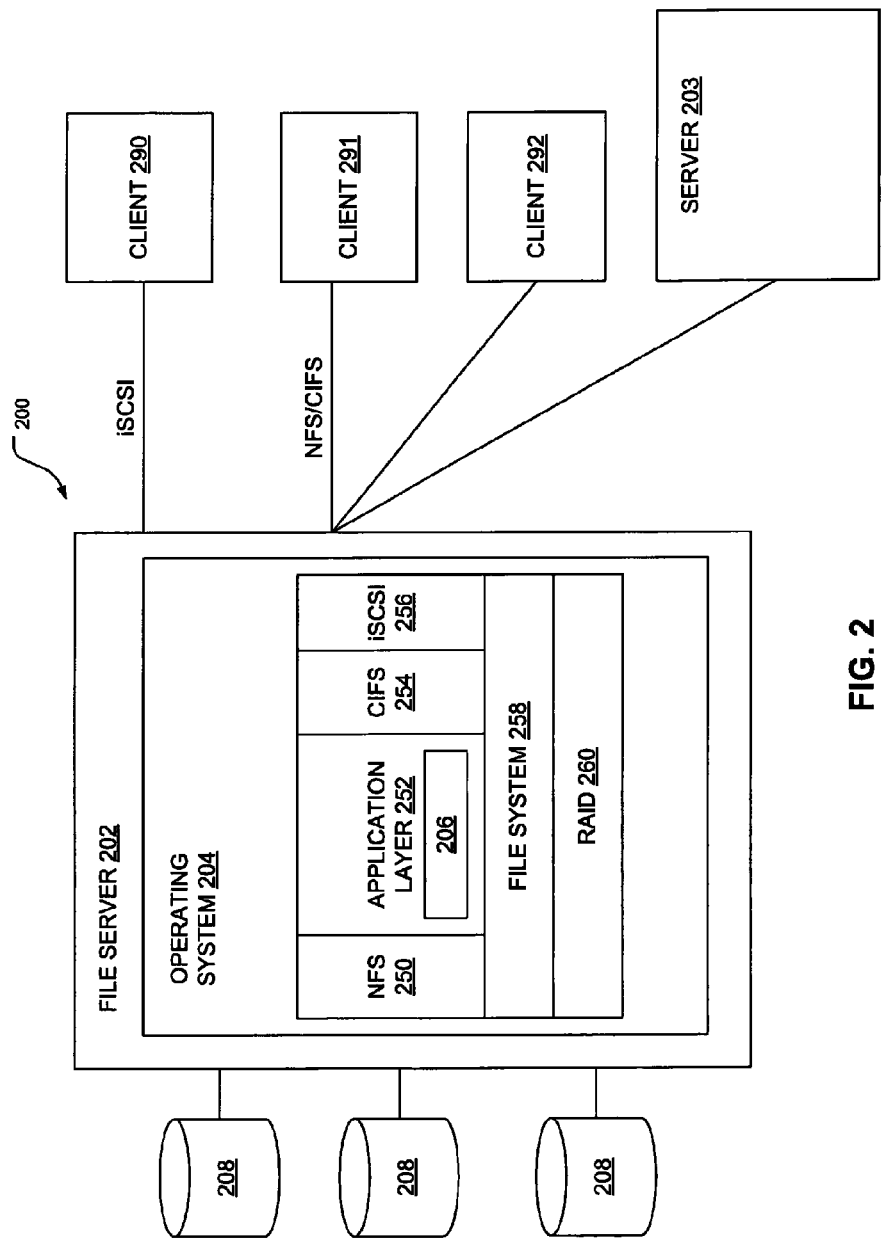
FIG. 2 is a simplified block diagram of a storage system, in accordance with an example embodiment, for searching and updating a file system.

FIG. 2 is a simplified block diagram of a storage system 200, in accordance with an example embodiment, for searching and updating a file system. Storage system 200 includes file server 202 in communication with clients 290-292 and server 203. File server 202, server 203 and clients 290-292 may be in communication by way of a network, which may include one or more Local Area Networks (LANs) and/or Wide Area Networks (WANs), such as the Internet. The Internet is an example of a WAN that connects disparate networks to provide communication between points on various networks. The points communicate by exchanging discrete frames or packets of data according to pre-defined protocols, such as Transmission Control Protocol/Internet Protocol (TCP/IP). It should be appreciated that various protocols can be used to transmit storage data over TCP/IP, such as Internet Small Computer System Interface (iSCSI), Network File System (NFS), Common Internet File System (CIFS), and other protocols. In the example illustrated in FIG. 2, file server 202 also is in communication with storage devices 208 (e.g., hard disks and tapes).

The clients 290-292 may access various services and functions supported by file server 202. For example, file server 202 may host file catalog module 206 that is configured to search for attributes that may be stored in file system 258. Generally, file server 202 is a computer that provides file services relating to the storage, organization, and access of data stored in storage devices 208. File server 202 may, for example, be a Network Attached Storage server. The file server 202 includes operating system 204 that, for example, manages the software processes and/or services executing on the file server. For example, operating system 204 may implement a write anywhere file system 258 that organizes data stored in storage devices 208 as a hierarchical structure of named directories and files.

As shown in FIG. 2, operating system 204 may support a variety of software layers 250, 252, 206, 254, 256, 258, and 260 organized to form a multi-protocol engine that provides data paths for clients 290-292 to access data stored in storage devices 208. The Redundant Array of Independent Disks (RAID) layer 260 provides the interface to RAID controllers. In general, a RAID controller can distribute data that file server 202 writes to a virtual hard disk over several storage devices 208. The file system 258 forms an intermediate layer between storage devices 208 and applications. It should be appreciated that storage devices 208 are block-oriented storage medias and file system 258 is configured to manage the blocks used by the storage devices. In addition, file system 258 provides clients 290-292 access to data organized in blocks by way of example directories and files.

The NFS layer 250, CIFS layer 254, and iSCSI layer 256 provide support for NFS, CIFS and iSCSI protocols, respectively. Additionally included is application layer 252 that interfaces to and performs common application services for application processes, such as file catalog module 206. As explained in more detail below, file catalog module 206 can be configured to search for and update attributes within file system 258. It addition to executing on file server 202, as shown in FIG. 2, file catalog module 206 may also be hosted on a client, such as client 290, or hosted on a separate server, such as server 203, that is in communication with the file server.

Figure 3:
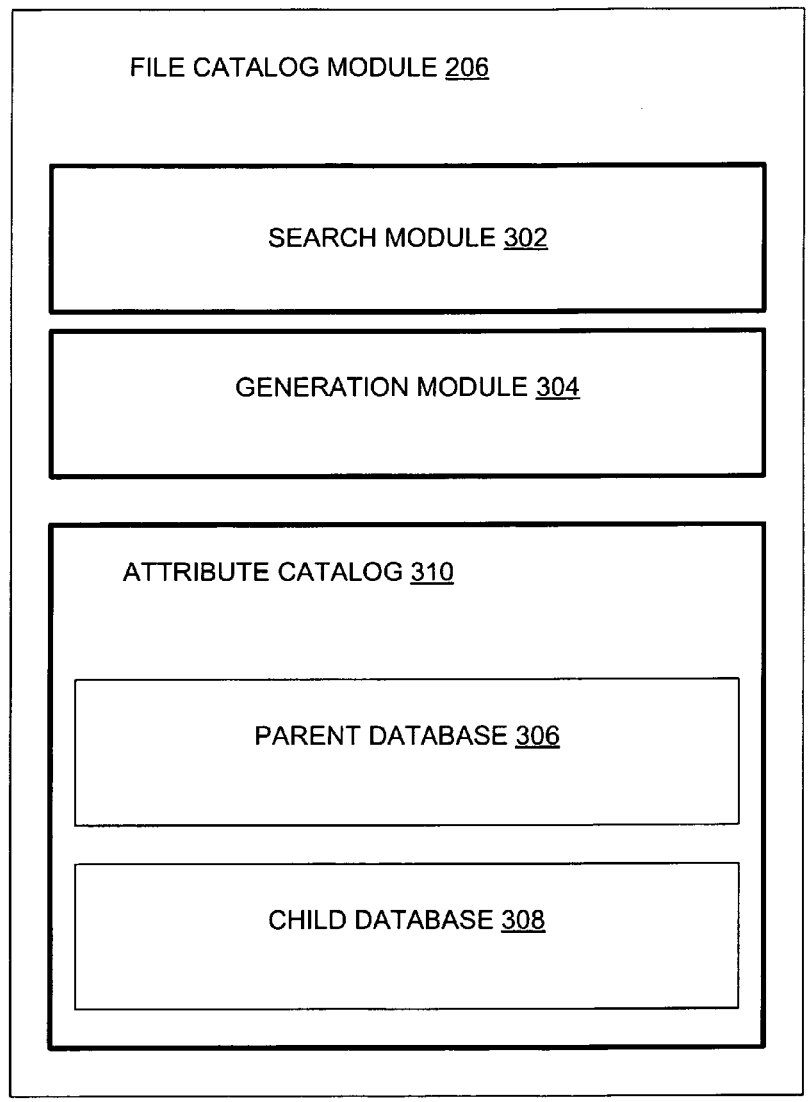
FIG. 3 is a simplified block diagram of modules, in accordance with an example embodiment, included in a file catalog module.

FIG. 3 is a simplified block diagram of modules, in accordance with an example embodiment, included in a file catalog module 206. The file catalog module 206 may include search module 302, generation module 304, and attribute catalog 310. It should be appreciated that file catalog module 206 may be deployed in a variety of computing systems. For example, file catalog module 206 may be hosted in one of the computing systems depicted in FIG. 2, such as server 202 or 203 or client 291.

Returning to FIG. 3, search module 302 is configured to search for attributes within a data structure, such as attribute catalog 310, following a hierarchical structure of the file system. As explained in more detail below, search module 302 may search for the attributes and/or signatures associated with the attributes. A signature is one or more values that compactly describe one or more attributes. The generation module 304 is configured to generate the signatures associated with the attributes. Additionally, as explained in more detail below, generation module 304 can be configured to update existing signatures in a data structure, such as attribute catalog 310, when attribute changes are detected.

Attribute catalog 310 is a data structure that is configured to store attributes and/or signatures associated with the attributes. In general, a data structure provides context for the organization of data. Examples of data structures include tables, arrays, linked lists, databases, and other data structures. The attributes and/or signatures are stored within attribute catalog 310 where the hierarchical structure is maintained. For example, attribute catalog 310 may include one or more indexes that identify the relationships between each node within the hierarchical structure. Here, an index may be constructed as a logical tree structure that follows the hierarchical structure of the file system. In an example embodiment, as shown in FIG. 3, attribute catalog 310 may include two, separate databases 306 and 308. Parent database 306 and child database 308 may be a type of database that stores arbitrary key/data pairs as byte arrays and supports multiple data items for a single key. Such database structure mirrors the hierarchical structure (e.g., tree structure) of the file system and thereby allows the hierarchical structure to be maintained. For example, parent database 306 includes a mapping of child nodes to parent nodes of a file system namespace. As illustrated above, a parent node may have multiple child nodes (e.g., multiple subdirectories or multiple files) and a child node may have multiple parent nodes. The parent database 306 may therefore map child node identifiers to their parent node identifiers. A node identifier is a value that identifies and can be used to locate a node of a file system namespace. Likewise, child database 308 includes a mapping of parent nodes to their child nodes, which therefore maps parent node identifiers to their child node identifiers. As a result, the relationships between nodes within a file system namespace can be derived from referring to both parent database 306 and child database 308.

It should be appreciated that in other example embodiments, file catalog module 206 may include fewer or more modules apart from those shown in FIG. 3. For example, search module 302 may be integrated with generation module 304 to form one module. In another example, attribute catalog 310 may be a single data structure that is configured to store attributes and/or signatures and the relationships between the nodes of the file system namespace.

File System Search

Figure 4:
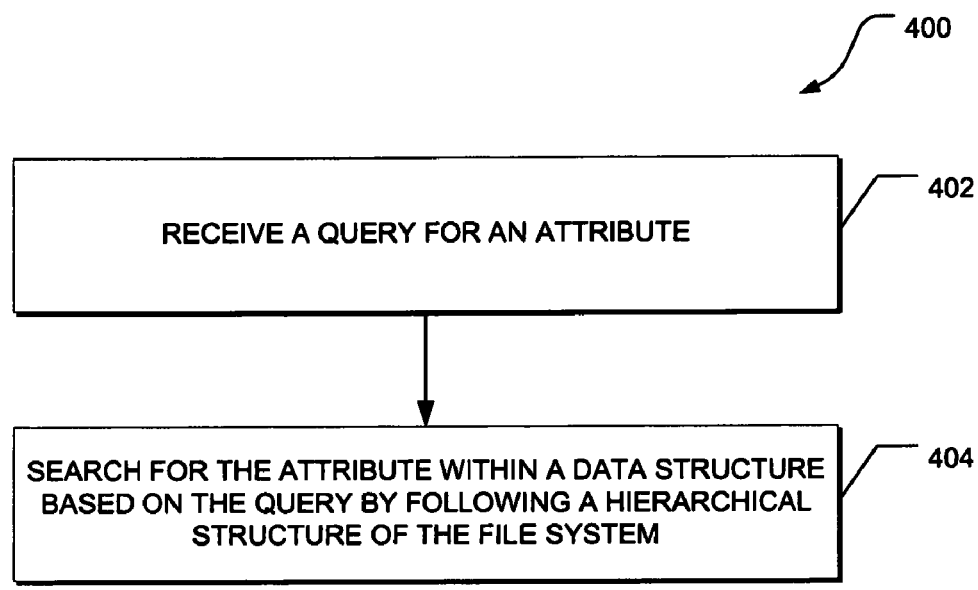
FIG. 4 is a flow diagram of a general overview of a method, in accordance with an example embodiment, for searching a file system.

FIG. 4 is a flow diagram of a general overview of a method 400, in accordance with an example embodiment, for searching a file system. In an example embodiment, method 400 may be implemented by file catalog module 206 of FIG. 3, employed in a computing system, such as client 290 of FIG. 2. As shown in FIG. 4, a query for one or more attributes is received at 402. A user or computing system may provide the query. A query is an enquiry about one or more attributes. For example, queries can include questions such as: "Which files are most critical to backup?" "Which users most utilize storage?" and ""Where should I place important files?" Other examples of queries can include "document type=.txt," "size <100 MB," and other queries. The queries may also be path-based. Path-based queries include one or more paths in the file system namespace and may additionally include enquiries of attributes below the paths. For example, a path-based query may be a question, "What files below /home/userA are greater than 10 GB and have not been accessed this month?" The path and attributes associated with this path-based query are: (1) path prefix="home/userA;" (2) size >=10 GB; and (3) access time <11/01/2007.

After the query is received, one or more attributes are searched within a data structure (e.g., an attribute catalog) at 404 based on the query by following a hierarchical structure of the file system. Instead of searching through the entire data structure for attributes defined by the query, a portion of the data structure is searched. Here, the attributes are stored within the data structure wherein the hierarchical structure is maintained. Accordingly, the search may follow the hierarchical structure of the file system by, for example, following a path defined by the hierarchical structure and eliminating or ignoring non-relevant paths. In an example, a path-based query may define a path along the hierarchical structure. The search for attributes (or signatures associated with the attributes) may be along the path, while ignoring other paths in the hierarchical structure that are not defined in the path-based query. As explained in more detail below, even without a pre-defined path from the query, the search can still progress following the hierarchical structure of the file system, which can also eliminate non-relevant paths.

Figure 5:
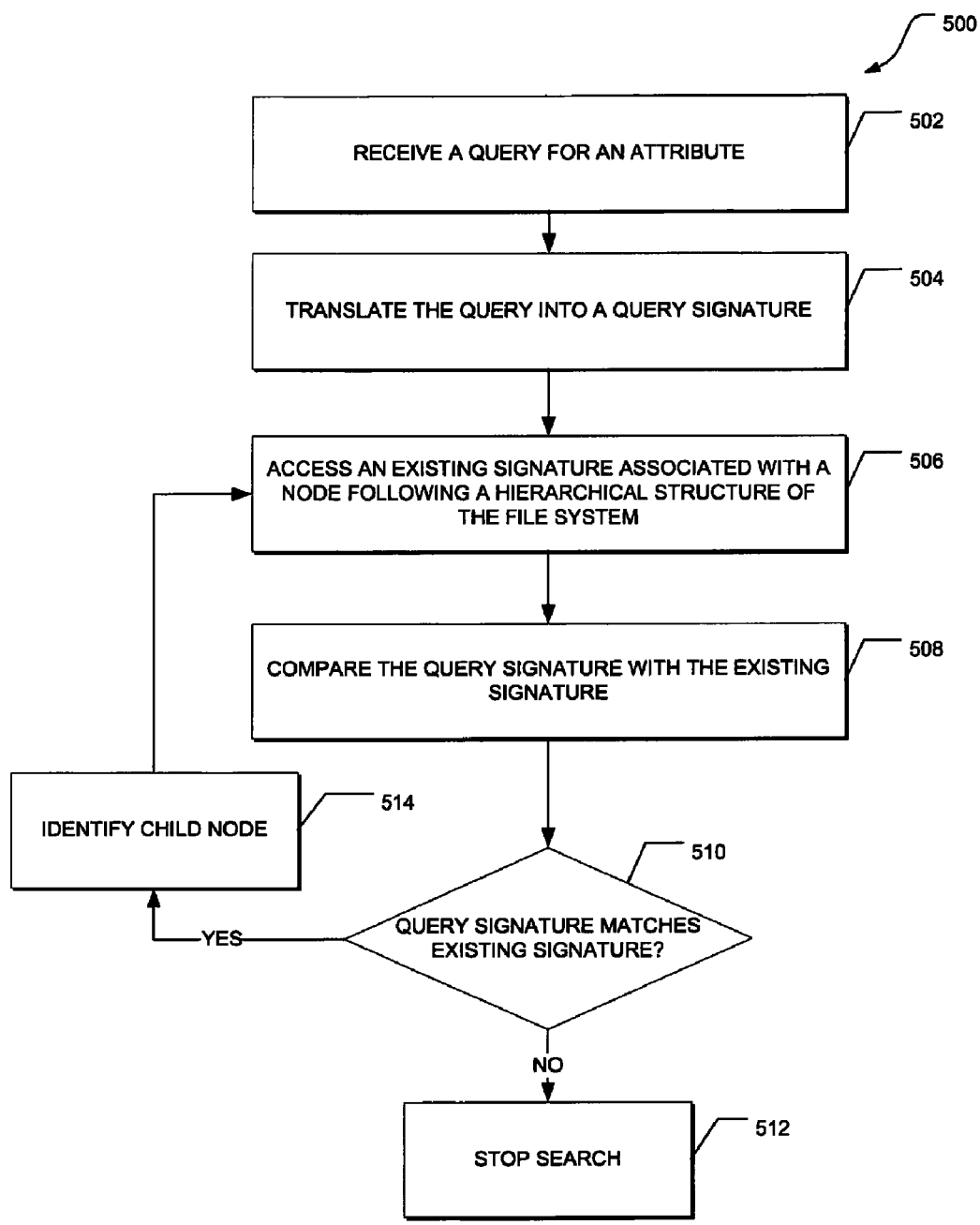
FIG. 5 is a flow diagram of detailed methods, in accordance with an example embodiment, for searching a file system.
Figure 7:
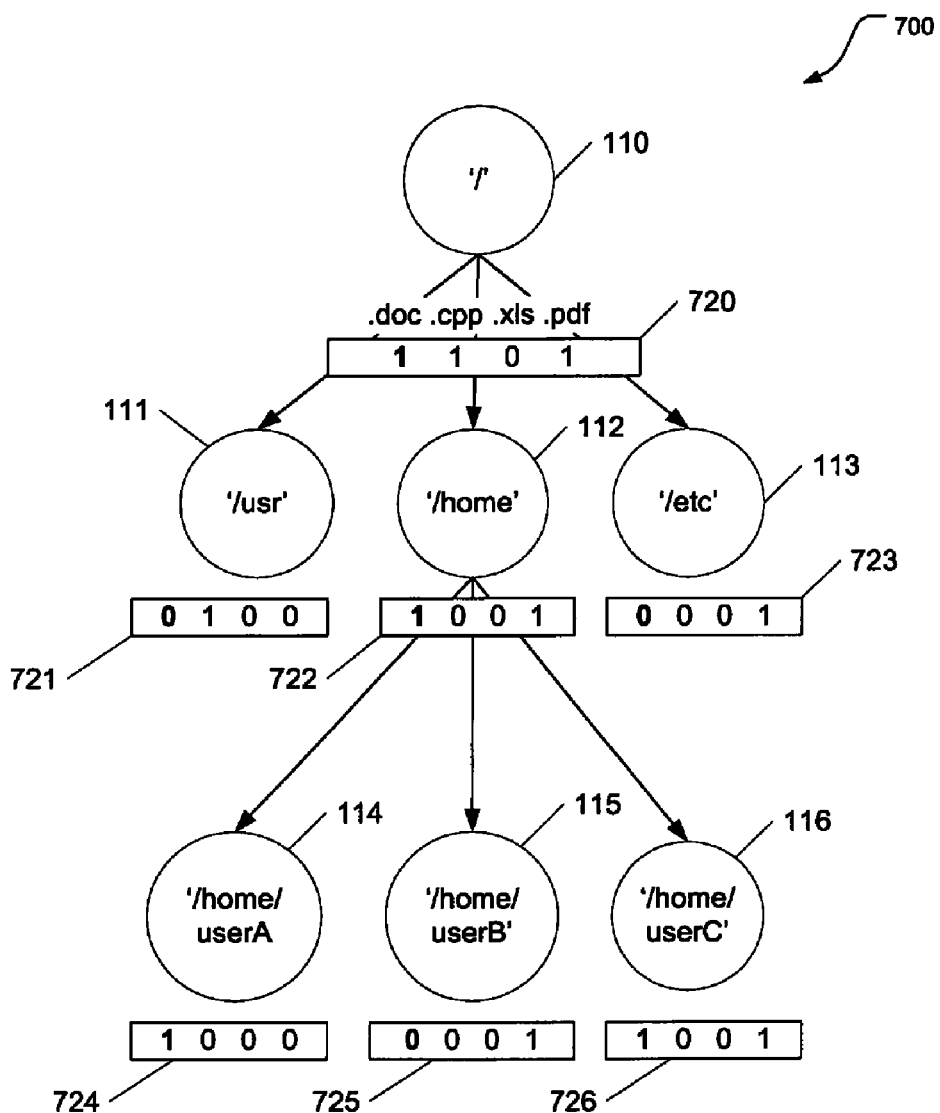
FIG. 7 is a diagram illustrating a search, in accordance with an example embodiment, of a file system.

FIG. 5 is a flow diagram of a detailed method 500, in accordance with an example embodiment, for searching a file system. As shown in FIG. 5, a query for one or more attributes is received at 502 and this query can be translated into a query signature at 504. As discussed above, a signature is one or more values that compactly describe one or more attributes. For example, the signature may be a bit array that compactly describes the file attributes of a subdirectory. Attributes have various value ranges and, as a result, signatures may also have a variety of different ranges of values. In an example, a signature can be constructed with a bit value that corresponds to each attribute value. For example, a bit value can correspond to a file type, such as document (e.g., with ".doc" extension), MPEG-1 Audio Layer 3 (e.g., with ".mpg" extension), spreadsheet (e.g., with ".xls" extension) or other file types. Here, a signature with a bit value of "1" can correspond to the existence of, for example, a ".doc" file within a subdirectory. On the other hand, a signature with a bit value of "0" can correspond to the absence of the ".doc" from the subdirectory. An example of attributes and signatures are illustrated below in FIG. 7. In an example, FIG. 7 shows signature 720, which is a four-bit array. Each bit of signature 720 corresponds to a file type attribute (e.g., ".doc," ".cpp," ".xls," and ".pdf").

In another example, the bit value can correspond to a range in the attribute, such as file size. A signature with a bit value of "1" can correspond to the existence of a file with a size that ranges between, for example, 0 to 500 MB. On the other hand, a signature with a bit value of "0" can correspond to the absence of a file with a size that ranges between 0 to 500 MB. In still another example, an array of bit values can be used to describe an attribute, such as time. For example, each bit value within the signature can correspond to a single day in the year (e.g., October 1$^{st}$) and a signature can be allocated for each day. With 366 (includes leap year) in a year, the signature may include 366 bits, which equals to 46 bytes.

A signature with each bit in a bit array corresponding to a single value in the attribute results in an accurate signature, but such signature can have a large size. The size of the signature can be reduced by a variety of methods. For example, a signature can be constructed that describes a set of pre-defined file types with a bit value corresponding to each pre-defined file type. These pre-defined file types may be a set of commonly occurring file types within a file system. For other non-defined file types, the signature may include a single bit value that describes these multiple, non-defined file types. Similarly, in another example, a signature can be constructed that describes a set of common file sizes with a bit value corresponding to each file size range (e.g., 1-2 KB). Such common file size ranges can be divided into discrete ranges (e.g., 1-2 KB, 2-3 KB, and 3-4 KB). On the other hand, file size ranges that are not common can be divided into large ranges (e.g., 500 MB to 1 GB). As a result, such signatures provide more accuracy for attributes that are common, while less accuracy for attributes that are obscure.

In an example embodiment, the query may be translated into one or more signatures by applying one or more hash functions to the query. A variety of hash functions may be applied to the query to generate the signature. For example, a single hash function may be applied. In another example, a Bloom filter may be used. A Bloom filter allows a variety of range values to map onto a fixed-size bit array by using a hash function modulo of the array size. For example, a Bloom filter may be a fixed-size bit array. A number of different hash functions are defined and each hash function maps a value to one or more of the array positions.

Returning to FIG. 5, after the query has been translated into one or more signatures, an existing signature is accessed from the data structure. This existing signature is associated with the attribute at issue as defined by the query. For example, at 506, an existing signature associated with a node is accessed from the data structure by following a hierarchical structure of the file system. The query may identify a start node. For example, the query may define a path (e.g., "/home/userC") along the hierarchical structure. The path may be translated into one or more nodes (or node identifiers). The start node may be a node that is located at the end of the path. Without a pre-defined path, a root node may be initially used (or identified) as a start node. The root node is the first or highest ranked node in the file system namespace, which does not have a parent node. A root directory is an example of a root node.

The existing signature associated with the node is accessed and, at 508, the query signature is compared with the existing signature to locate the attribute. As illustrated at 510, if the query signature does not match the existing signature, then the attribute at issue is absent. As a result, the search is stopped at 512 and the signatures associated with the child nodes of the node are not searched. The child nodes (e.g., subdirectories) therefore can be excluded from the search, thereby reducing the search time. The search is stopped at 512 because FIG. 5 illustrates a single instance of the query. Here, the search is stopped along a single path of the hierarchical structure. However, it should be noted that searches along other paths may continue.

On the other hand, as illustrated at 510, if the query signature matches the existing signature, then the attribute is located. As explained in more detail below, this node (or node identifier) may then be identified for a further search within another data structure that stores the actual attributes. Thereafter, one or more child nodes are identified at 514, and the existing signature associated with the child node is accessed. As illustrated in FIG. 5, another comparison is made between the query signature and the existing signature. The method continues until a leaf node is reached, which is a node furthest from the root node that does not have a child node.

Figure 6:
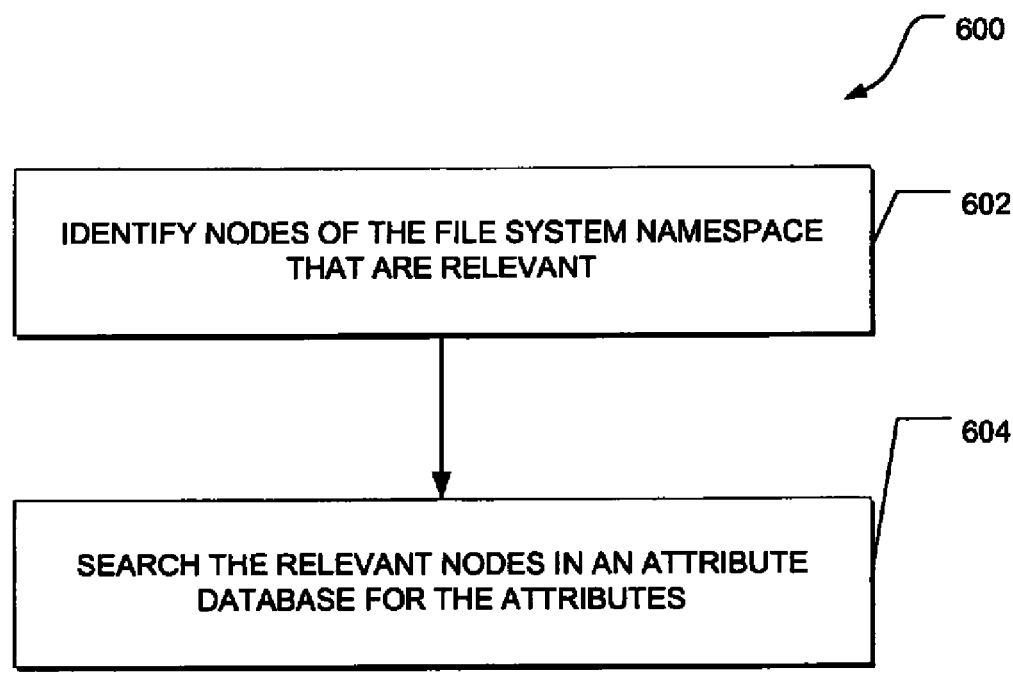
FIG. 6 is a flow diagram of a method, in accordance with an example embodiment, for a detailed search of attributes.

FIG. 6 is a flow diagram of a method 600, in accordance with an example embodiment, for a detailed search of attributes. As discussed above, in an example embodiment, the attributes and information associated with the attributes (e.g., signatures) may be stored in a single data structure. In an alternative example embodiment, the attributes and information associated with the attributes may be stored separately in two or more data structures. For example, the signatures associated with the attributes may be stored in one data structure (e.g., the attribute catalog) while the actual attributes may be stored in a separate data structure (e.g., attribute database). In an example embodiment, with reference to FIG. 2, attribute catalog may be hosted on server 203 while attribute database may be hosed on file server 202.

FIG. 6 shows a method 600 of a search for attributes when the signatures associated with the attributes are stored separately from the attributes. In this example, the node identifiers and the signatures are stored in the attribute catalog. The attribute catalog includes the associations between the node identifiers and the signatures. For example, the attribute catalog may use the node identifiers as an index and the signatures may be stored such that each signature is associated with a node identifier. On the other hand, the actual attributes associated with the nodes are stored separately, for example, in an attribute database. Here, the attribute database may also use the node identifiers as an index. The attributes are stored in the attribute database such that each attribute is associated with a node identifier.

Starting at 602, the nodes of the file system namespace that are relevant are identified. For example, the attribute catalog is initially searched for matches between query signatures and existing signatures. If a query signature matches an existing signature that is associated with a particular node identifier, then this node identifier is identified (or flagged) as relevant. As a result, a search of the attribute catalog following a hierarchical structure of the file system provides a set of node identifiers that are relevant.

With the relevant nodes identified (or provided), the relevant nodes in the attribute database are searched for the attributes at 604. In an example, a set of relevant node identifiers are provided from the search of the attribute catalog. The same set of relevant node identifiers are located or identified in the attribute database, and the attributes associated with the relevant node identifiers are searched. It should be noted that a search of signatures is faster than a search of the actual attributes. As a result, searching the signatures initially in the attribute catalog provides a way to quickly identify a set of relevant nodes. The attributes associated with the relevant nodes are then thoroughly searched in the attribute database.

FIG. 7 is a diagram illustrating a search, in accordance with an example embodiment, of a file system. FIG. 7 illustrates nodes 110-116 associated with a file system namespace. Hierarchical structure 700 of the file system is a tree structure and nodes 110-116 correspond to directories of the file system namespace. Additionally illustrated below nodes 110-116 are signatures 720-726 associated with the nodes. For example, signature 720 is associated with node 110 and signature 726 is associated with node 116. Each signature 720, 721, 722, 723, 724, 725 or 726 is a four-bit array (e.g., "1 1 0 1" and "1

0 0 1). The first bit from the left corresponds to the ".doc" file type. A bit value of "1" corresponds to the existence of a ".doc" file. However, a bit value of "0" corresponds to the absence of a ".doc" file. The second, third, and fourth bits from the left correspond to the ".cpp," ".xls," and ".pdf" file types, respectively.

In this example, a query is received inquiring the existence of ".doc" files in the file system. The query is then translated to a query signature, such as a signature with bit value of "1." The node identifier associated with root node ("/") 110 within an attribute catalog is identified and signature 720 associated with the root node is accessed. The query signature "1" is compared to the portion of signature 720 associated with ".doc" attribute, which also has a signature value of "1." The query signature and signature 720 match and, as a result, the node identifier associated with the signature is flagged for a further search.

Thereafter, node identifiers associated with child nodes 111-113 of node 110 are identified in attribute catalog and comparisons with signatures 721-723 associated with the child nodes are made with the query signature. As illustrated in FIG. 7, signature 722 matches the query signature but signatures 721 and 723 do not match the query signature. The mismatch of signatures 721 and 723 indicates that directories "/usr" and "etc." (or nodes 111 and 113) do not include ".doc" files. The nodes 111 and 113 can therefore be excluded from the search and only the node identifier associated with node 112 is flagged for a further search.

Following hierarchical structure 700 of the file system, the node identifiers associated with child nodes 114-116 of node 112 are identified in attribute catalog and comparisons with signatures 724-726 associated with the child nodes are made with the query signature. Here, signatures 724 and 726 match the query signature but signature 725 does not match the query signature. Accordingly, node 115 can be excluded from the search and node identifiers associated with nodes 724 and 726 are flagged from a further search. The search of signatures 720-726 within attribute catalog identifies relevant nodes 110, 112, 114 and 116. The attributes associated with nodes 110, 112, 114 and 116 then are searched within an attribute database.

It should be noted that in many searches, only a portion of the values within each signature may be relevant to the search. For example, a search for ".doc" file type within a signature may include a search of the entire signature (e.g., 1 1 0 1). However, in the examples described above, only the first bit from the left correspond to the ".doc" file type. The extra searches and retrievals of entire signatures can be eliminated by employing a bit-sliced index, in accordance with an example embodiment. In a bit-sliced index, instead of storing the signatures as B bits representing N nodes, the signatures can be stored in B nodes, each node with signatures of N bits. For example, if a file system namespace has five nodes and each node includes three-bit signatures, then a bit-sliced representation of the signature can be represented in the following Table A.

TABLE A

| Non-Bit-Sliced Representation | Bit-Sliced Index Representation |
|---|---|
| 001 | 01101 |
| 101 | 00111 |
| 110 | 11011 |
| 011 | |
| 111 | |

As an example, if each of the B bits in a signature corresponds to different file types, such as ".doc," ".pdf," and ".ppt," then a search over a non-bit-sliced representation for ".pdf" file may require retrieval of BN bits since each signature is fully read to check the ".pdf" bit. However, in a bit-sliced index, N bits are searched because N bits correspond the ".pdf" contents of N nodes in a bit-sliced index. Since N bits are less then BN bits, a search with a bit-sliced index can further improve the speed of a search.

File System Update

Figure 8:
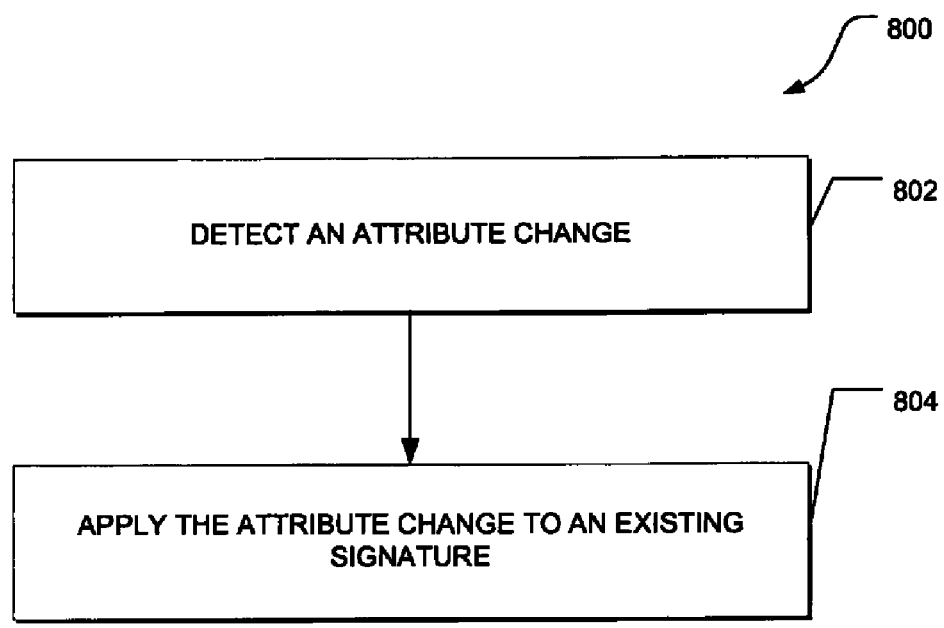
FIG. 8 is a flow diagram of a general overview of a method, in accordance with an example embodiment, for updating a file system.

FIG. 8 is a flow diagram of a general overview of a method 800, in accordance with an example embodiment, for updating a file system. In an example embodiment, method 800 may be implemented by file catalog module 206 of FIG. 3, employed in a computing system, such as server 203 of FIG. 2. A data structure of signatures (e.g., an attribute catalog) can be constructed or built by translating the attributes to signatures and associating the signatures with their node identifiers, as explained in more detail below. As attributes change, updates are made to the signatures. As shown in FIG. 8, a change to one or more attributes (or attribute change) is detected at 802. The attribute change is to a node associated with a file system namespace. An example of an attributes change is the addition of a node (e.g., addition of a file or directory). Another example of an attribute change is the removal of a node from the file system namespace (e.g., removal of a file or directory). In still another example, an attribute change may include modification of a node in the file system namespace.

After the attribute change is detected, the attribute change is applied to one or more existing signatures at 804. The attribute change can be applied to a variety of nodes depending on the type of attribute change (e.g., addition or removal of nodes). For example, as explained in more detail below, if the attribute change is an addition of a node, then the attribute change may be applied to the parent nodes of the added node. However, if the attribute change is the removal of a node, then a determination is made as to whether the removal will change the signatures associated with other nodes. Depending on the effect of the change, the attribute change may be applied to the relevant nodes. The application of the attribute change, as explained in more detail below, may include combining a signature associated with the attribute change and an existing signature based on a signature operator.

Figure 9:
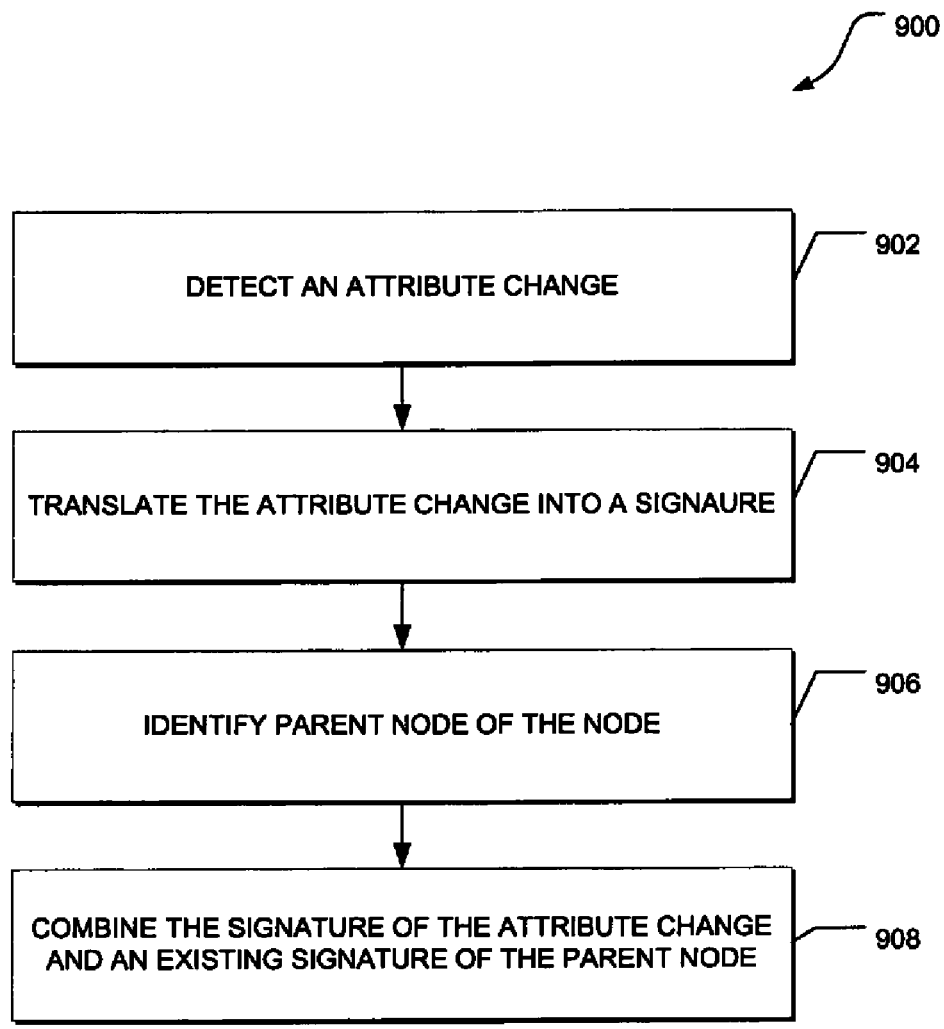
FIG. 9 is a flow diagram of a method, in accordance with an example embodiment, for updating the file system when a node is added.

FIG. 9 is a flow diagram of a method 900, in accordance with an example embodiment, for updating the file system when a node is added. Starting at 902, an attribute change is detected. Here, the attribute change is the addition of a node to the file system namespace. For example, a file or directory may be added. The attribute change then is translated into one or more signatures at 904. As discussed above, the attribute change can be translated into a signature by the application of one or more hash functions to the attribute change.

The signature may be included in an additive stream, which is a list of signatures and the nodes (or node identifiers) that are affected by the attribute change. This additive stream may then be applied to a data structure with the signatures (e.g., the attribute catalog) following the hierarchical structure of the file system. For example, as illustrated in FIG. 9, the parent node of the added node is identified at 906. The attribute change may be applied to an existing signature associated with the parent node based on the translated signature. In an example, as illustrated at 908, attribute change may be applied by combining the signature associated with the attribute change and an existing signature associated with the parent node with a signature operator. A signature operator serves to produce a combined value based on two or more signatures. For example, the signature operator may be a bitwise operator. An example of a bitwise operator can include a bitwise OR operator. After the change is applied to the existing signature associated with the parent node, the parent node of the parent node is identified and the attribute change can be applied again. The application of the attribute change continues following the hierarchical structure until a root node is reached (or identified) or until the existing signatures of the parent node are not affected by the attribute change.

Figure 10:
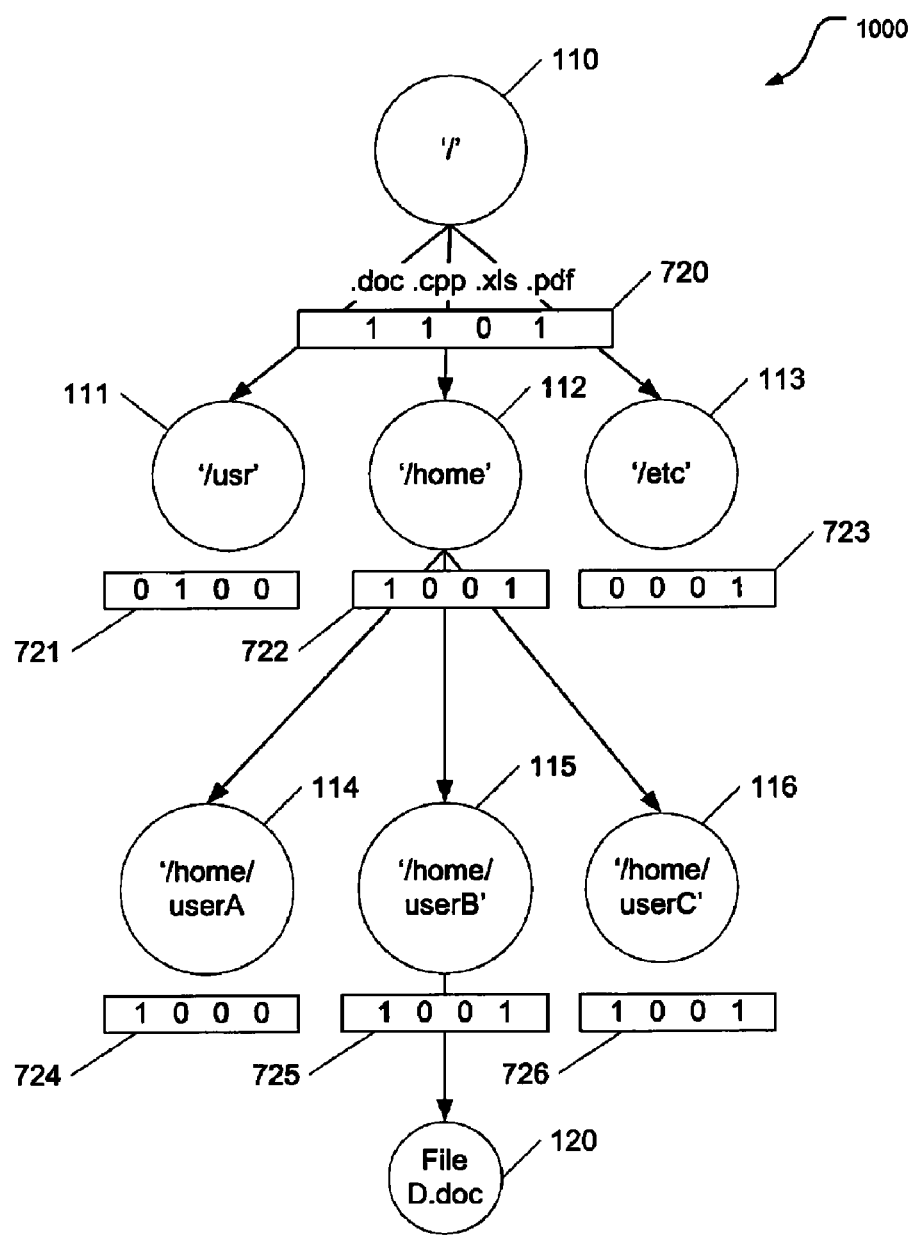
FIG. 10 is a diagram illustrating an update, in accordance with an example embodiment, to a file system when a file is added.

FIG. 10 is a diagram illustrating an update, in accordance with an example embodiment, to a file system when a file is added. FIG. 10 illustrates nodes 110-116 associated with a file system namespace. Hierarchical structure 1000 of the file system is a tree structure where nodes 110-116 correspond to directories and node 120 correspond to a file. Additionally illustrated below nodes 110-116 are signatures 720-726 associated with the nodes. For example, signature 725 is associated with node 115 and signature 722 is associated with node 112. Each signature 720, 721, 722, 723, 724, 725 or 726 is a four-bit array (e.g., "1 1 0 1" and "1 0 0 1"). The first bit from the left correspond to the ".doc" file type. A bit value of "1" corresponds to the existence of a ".doc" file. However, a bit value of "0" corresponds to the absence of a ".doc" file. The second, third, and fourth bits from the left correspond to the ".cpp," ".xls," and ".pdf" file types, respectively.

In the example illustrated in FIG. 10, the attribute change is the addition of node 120 to the file system namespace. The node 120 is a file with a ".doc" extension. The addition of node 120 is translated into a signature with a bit value of "1," which corresponds to the existence of a ".doc" file. Parent node 115 of added node 120 is identified within, for example, an attribute catalog and existing signature 725 associated with the parent node is accessed from the attribute catalog. Originally, signature 725 is a four-bit array with values "0 0 0 1" (not shown). The first bit from the left correspond to the ".doc." file type, which has a bit value of "0" that indicates the absence of ".doc" files.

The attribute change may be applied by combining the signature associated with the addition of node 120 and existing signature 725 with a signature operator, such as a bitwise OR operator. The application of the bitwise OR operator on signature with bit value "1" and portion of signature 725 with bit value "0" produces a bit value of "1." As a result, as illustrated in FIG. 10, the application of the attribute change to existing signature 725 changes the existing value from "0 0 0 1" to "1 0 0 1."

Following hierarchical structure 1000, parent node 112 of node 115 is identified. Signature 722 associated with parent node 112 is a four-bit array with values "1 0 0 1." Since the first bit from the left already has a bit value of "1," the application of the attribute change does not change this bit value. For example, the application of the bitwise OR operator on signature with bit value "1" and portion of signature 722 with bit value "1" produces a bit value of "1." Since the existing signature 722 of parent node 112 is not affected by the attribute change, the search for parent nodes stops and the attribute change is not applied to signatures of other parent nodes, such as signatures 720, 721, and 723.

Figure 11:
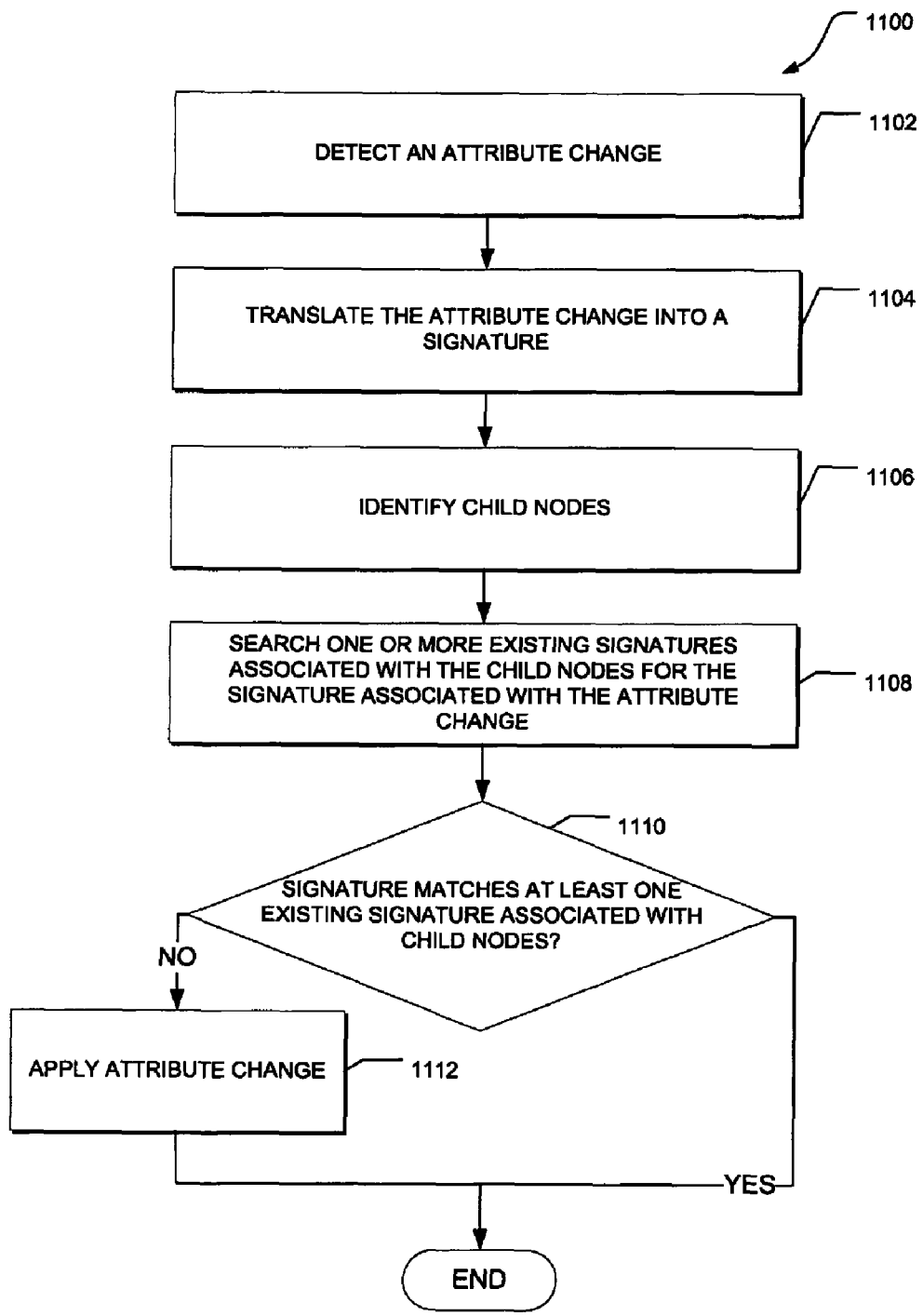
FIG. 11 is a flow diagram of a method, in accordance with an example embodiment, for updating the file system when a node is removed.

FIG. 11 is a flow diagram of a method 1100, in accordance with an example embodiment, for updating the file system when a node is removed. Starting at 1102, an attribute change is detected. Here, the attribute change is the removal of a node from the file system namespace. For example, a file or directory may be removed. The attribute change then is translated into one or more signatures at 1104.

The signature may be included in a subtractive stream, which is a list of signatures and the nodes (or node identifiers) that are affected by the attribute change. This subtractive stream may then be applied to a data structure with the signatures (e.g., the attribute catalog) following a hierarchical structure of the file system. For example, as illustrated in FIG. 11, one or more child nodes associated with the removed node are identified at 1106 following the hierarchical structure, and the signatures associated with the child nodes are accessed. For example, the subdirectories of a directory may be identified and the signatures associated with the subdirectories are accessed.

Depending on the content of signatures associated with the child nodes, the attribute change may be applied to an existing signature. Here, the existing signatures associated with the child nodes are searched at 1108 for the signature associated with attribute change. For example, existing signatures may be searched to identify a match with the signature associated with the attribute change. As illustrated at 1108, if at least one existing signature associated with the child nodes matches the signature associated with the attribute change, then the attribute change is not applied. The attribute change cannot be applied because that same attribute still exists within the child nodes. On the other hand, if the signature associated with the attribute change does not match the existing signatures, then the attribute change is applied at 1112. The attribute change can be applied because that attribute does not exist within the child nodes.

Figure 12:
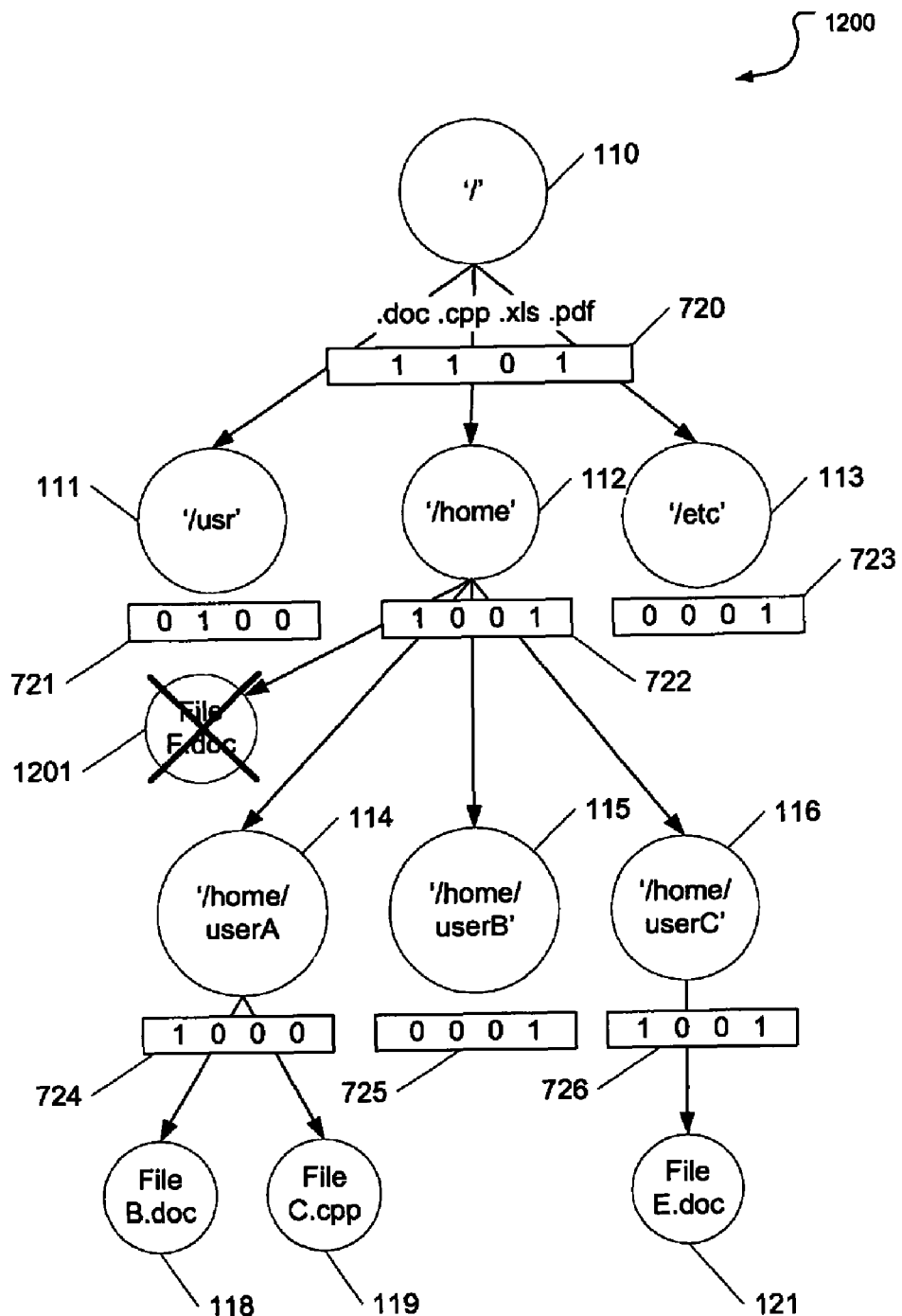
FIG. 12 is a diagram illustrating an update, in accordance with an example embodiment, to a file system when a file is removed.

FIG. 12 is a diagram illustrating an update, in accordance with an example embodiment, to a file system when a file is removed. FIG. 12 illustrates nodes 1201, 118, 119, 121 and 110-116 associated with a file system namespace. Hierarchical structure 1200 of the file system is a tree structure where nodes 110-116 correspond to directories and nodes 1201, 118, 119, and 121 correspond to files. Additionally illustrated below nodes 110-116 are signatures 720-726 associated with the nodes. Each signature 720, 721, 722, 723, 724, 725 or 726 is a four-bit array (e.g., "1 1 0 1" and "1 0 0 1"). The first bit from the left correspond to the ".doc" file type. A bit value of "1" corresponds to the existence of a ".doc" file. However, a bit value of "0" corresponds to the absence of a ".doc" file. The second, third, and fourth bits from the left correspond to the ".cpp," ".xls," and ".pdf" file types, respectively.

In the example illustrated in FIG. 12, the attribute change is the removal of node 1201 from the file system namespace. Node 1201 is a file with a ".doc" extension. Accordingly, the change is to both nodes 1201 and 112 of the file system namespace because node 1201 is included in node 112 (or file is included in the directory). Similar to the addition of a node, the removal of node 1201 also is translated into a signature with a bit value of "1," which corresponds to the existence of a ".doc" file. The child nodes 114-116 associated with node 112 are identified by following hierarchical structure 1200 and existing signatures 724-726 associated with the child nodes are accessed.

The existing signatures 724-726 are searched for a match with signature with bit value of "1," which is associated with the attribute change. As illustrated in FIG. 12, subdirectory 114 (or node 114) includes file 118 (or node 118) with ".doc" file type. Additionally, subdirectory 116 (or node 116) includes file 121 (or node 121) with ".doc" file type. Accordingly, both portions of signatures 724 and 726 that correspond with the ".doc" file type have bit values of "1." This bit value of "1" matches the signature bit value of "1" associated with the attribute change. The attribute change therefore cannot be applied to signature 722 because subdirectories 114 and 116 still include "doc." files 118 and 121. As such, signature 722 with values "1 0 0 1" remains unchanged.

It should be noted that an attribute change in the form of a modification to an existing node in the file system namespace can be applied by removing the existing node (or existing signature) and then adding a new node with updated attributes. Both methods for removing and adding nodes are described above. Furthermore, it should be noted that a data structure (e.g., an attribute catalog) with a complete set of signatures can be built from the beginning by adding the nodes associated with a file system namespace. As described above, the nodes may be constructed by adding nodes and combining their signatures with the signatures associated with their parent nodes with, for example, a bitwise OR operator. Alternatively, when constructing the signatures, only the signatures associated with parent directories are updated. For example, a signature associated with a parent directory is combined with a signature associated with a file with a signature operator. The signatures of nodes above the immediate parent node are not updated. For example, the parent directory of a directory is not thereafter updated. Once all the file and directories are added, then a final update or recalculation is made to the signatures from the leaf nodes to the root node following hierarchical structure 1200.

Figure 13:
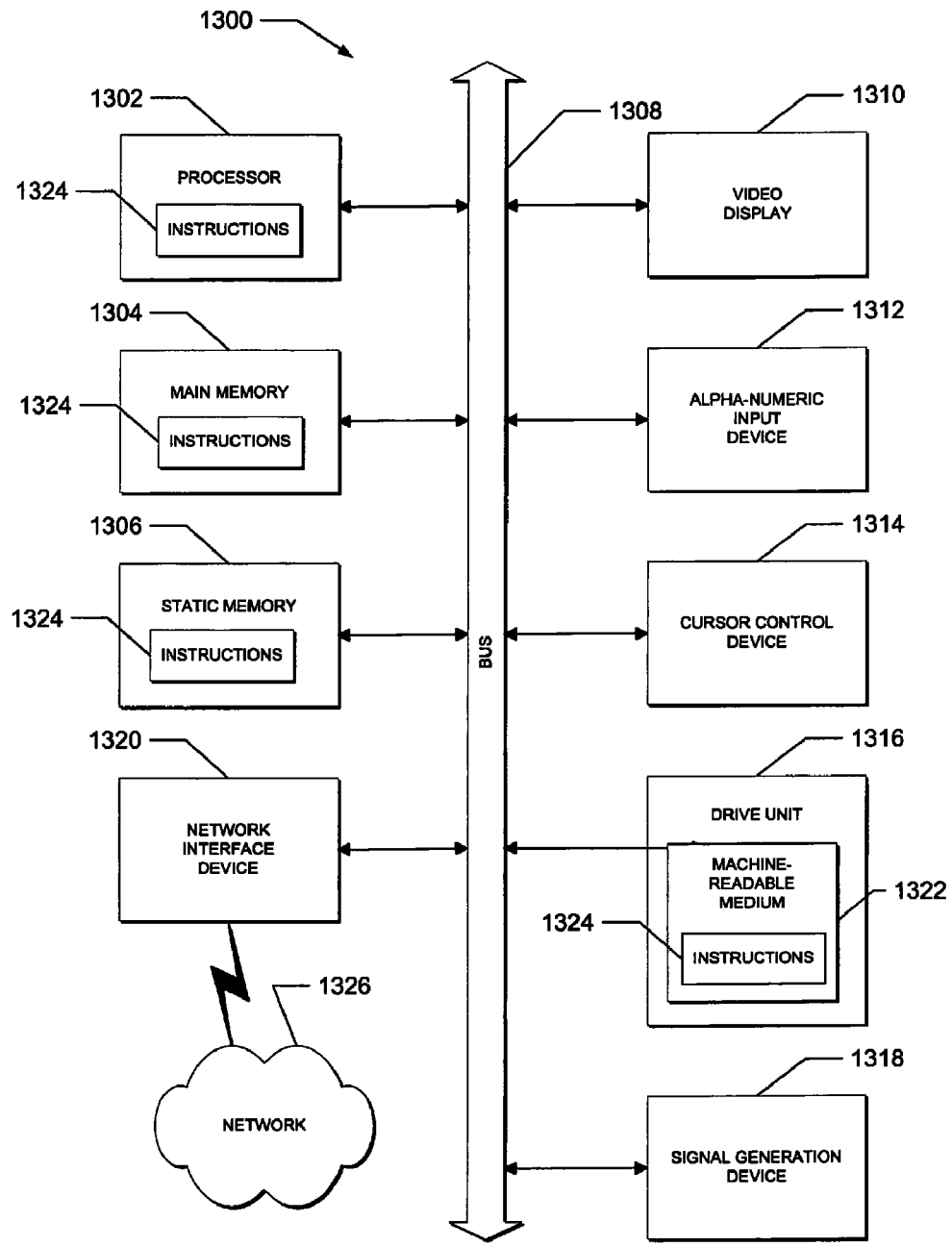
FIG. 13 is a simplified block diagram of a machine in the example form of a computing system within which a set of instructions, for causing the machine to perform any one or more of the methodologies discussed herein, may be executed.

FIG. 13 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 1300 includes processor 1302 (e.g., a central processing unit (CPU), a graphics processing unit (GPU) or both), main memory 1304 and static memory 1306, which communicate with each other via bus 1308. Computing system 1300 may further include video display unit 1310 (e.g., a plasma display, a liquid crystal display (LCD) or a cathode ray tube (CRT)). Computing system 1300 also includes alphanumeric input device 1312 (e.g., a keyboard), user interface (UI) navigation device 1314 (e.g., a mouse), disk drive unit 1316, signal generation device 1318 (e.g., a speaker) and network interface device 1320.

Disk drive unit 1316 includes machine-readable medium 1322 on which is stored one or more sets of instructions and data structures (e.g., software 1324) embodying or utilized by any one or more of the methodologies or functions described herein. Software 1324 may also reside, completely or at least partially, within main memory 1304 and/or within processor 1302 during execution thereof by computing system 1300, with main memory 1304 and processor 1302 also constituting machine-readable, tangible media. Software 1324 may further be transmitted or received over network 1326 via network interface device 1320 utilizing any one of a number of well-known transfer protocols (e.g., Hypertext Transfer Protocol (HTTP)).

While machine-readable medium 1322 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for searching a file system, the method comprising:
   receiving a query for an attribute, the attribute being organized following a hierarchical structure of the file system and stored within a data structure where the hierarchical structure is maintained, the attribute further being metadata about at least one of a directory or a file associated with the file system; and
   searching for the attribute within the data structure based on the query by following the hierarchical structure of the file system, the searching for the attribute comprising:
   translating the query into a first signature, the first signature being a first value that describes the attribute, a size of the first value being smaller than a size of the attribute based on a bit of the first value corresponding to multiple values in the attribute;
   accessing a second signature from the data structure, the second signature being a second value that describes the attribute, a size of the second value being smaller than the size of the attribute based on a bit of the second value corresponding to the multiple values in the attribute; and
   comparing the first signature with the second signature to locate the attribute.

2. The method of claim 1, wherein the hierarchical structure is maintained by including an index within the data structure, the index identifying a relationship between each node within the hierarchical structure.

3. The method of claim 1, wherein the second signature is associated with a node of a file system namespace, the method further comprising:
   identifying a child node of the node when the first signature matches the second signature;
   accessing a third signature that is associated with the attribute and is associated with the child node; and
   comparing the first signature with the third signature to locate the attribute.

4. The method of claim 1, wherein the second signature is associated with a node of a file system namespace, the method comprising identifying the node for a further search when the first signature matches the second signature.

5. The method of claim 1, wherein the translating of the query into the first signature comprises applying a hash function to the query.

6. The method of claim 1, wherein the hierarchical structure is a tree structure.

7. A computing system for searching a file system, the computing system comprising:
   a processor; and
   a memory in communication with the processor, the memory comprising a plurality of instructions executable by the processor, when the plurality of instructions are executed the processor being configured to:
   receive a query for an attribute, the attribute being metadata about at least one of a directory or file associated with the file system and being organized following a hierarchical structure of the file system;
   translate the query into a first signature, the first signature being a first value that describes the attribute, a size of the first value being smaller than a size of the attribute based on a bit of the first value corresponding to multiple values in the attribute;
   identify a directory by following the hierarchical structure of the file system;
   access a second signature that is associated with the directory from a data structure, the second signature being a second value that describes the attribute, a size of the second value being smaller than the size of the attribute based on a bit of the second value corresponding to the multiple values in the attribute; and
   compare the first signature with the second signature to locate the attribute.

8. The computing system of claim 7, wherein the processor is further configured to:
   identify a subdirectory of the directory when the first signature matches the second signature;
   access a third signature that is associated with the subdirectory from the data structure and is associated with the attribute; and
   compare the first signature with the third signature to locate the attribute.

9. The computing system of claim 8, wherein the subdirectory is identified by following the hierarchical structure.

10. The computing system of claim 8, wherein the processor is further configured to identify the subdirectory for a further search when the first signature matches the third signature.

11. The computing system of claim 7, wherein the data structure includes a plurality of signatures and a plurality of node identifiers, the plurality of signatures being stored within the data structure where the hierarchical structure is maintained.

12. The computing system of claim 7, wherein the processor is further configured to translate a path identified in the query into a node identifier, wherein the directory is identified based on the node identifier.

13. A method for updating a file system, the method comprising:
   detecting an attribute change associated with a node, the node being associated with a file system namespace; and
   applying the attribute change to an existing signature, the existing signature being a value that describes an attribute, the attribute being metadata about at least one of a directory or a file associated with the file system, a size of the value being smaller than a size of the attribute based on a bit of the value corresponding to multiple values in the attribute,
   wherein the applying of the attribute change comprises combining a signature associated with the attribute change and the existing signature with a signature operator.

14. The method of claim 13, further comprising translating the attribute change into a signature, the applying the attribute change to the existing signature being based on the signature.

15. The method of claim 13, wherein the attribute change is an addition of the node to the file system namespace, the method further comprising:
   identifying a parent node of the node; and
   combining a signature associated with the attribute change and a signature associated with the parent node with a signature operator.

16. The method of claim 13, wherein the attribute change is a removal of the node from the file system namespace, the method further comprising:
   translating the attribute change into a first signature;
   identifying a child node of the node; and
   searching a second signature associated with the child node for the first signature,
   wherein the attribute change is applied to the existing signature when the first signature is absent from the child node.

17. A computing system for updating a file system, the computing system comprising:
   a processor; and
   a memory in communication with the processor, the memory comprising a plurality of instructions executable by the processor, when the plurality of instructions are executed the processor being configured to:
   detect an attribute change associated with a file, the file being included within a directory;
   apply a hash function to the attribute change to provide a signature, the signature being a value that describes an attribute, the attribute being metadata about at least one of a directory or a file associated with the file system, a size of the value being smaller than a size of the attribute based on a bit of the value corresponding to multiple values in the attribute; and
   apply the attribute change to an existing signature that is associated with the directory based on the signature, the application of the attribute change comprises combining the signature associated with the attribute change and the existing signature with a signature operator.

18. The computing system of claim 17, wherein the applying of the attribute change comprises combining the signature and the existing signature with a bitwise OR operator.

19. The computing system of claim 17, wherein the attribute change is an addition of the file to the directory, the processor being further configured to:

identify a parent directory of the directory by following a hierarchical structure of the file system; and combine the signature and a signature associated with the parent directory with a bitwise OR operator.

20. The computing system of claim 17, wherein the attribute change is a removal of the file from the directory, the processor being further configured to:

identify a subdirectory of the directory by following a hierarchical structure of the file system; and search a plurality of signatures associated with the subdirectory for the signature, wherein the attribute change is applied to the existing signature when the signature is absent from the subdirectory.

* * * * *